Jan. 21, 1936.　　　A. S. HOWELL　　　2,028,608
MOTION PICTURE CAMERA AND THE LIKE
Filed Jan. 12, 1931　　　12 Sheets-Sheet 1

Inventor:
Albert S. Howell
By Michle & Michle
Attys

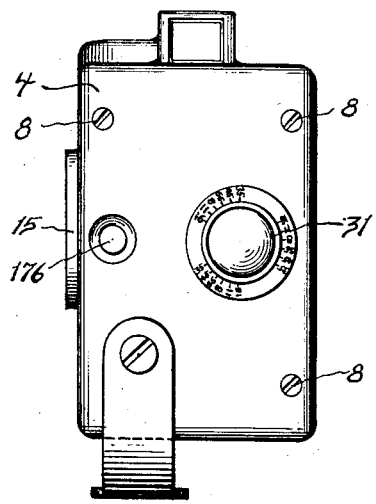
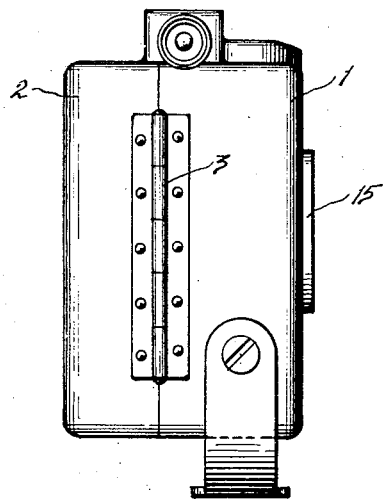
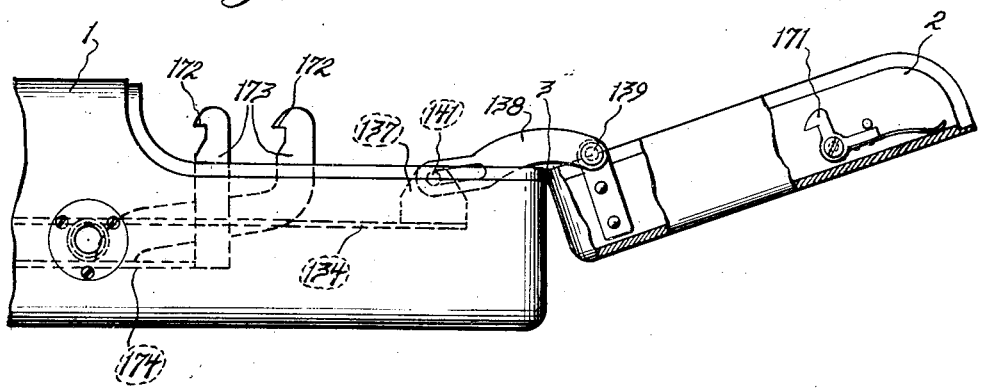

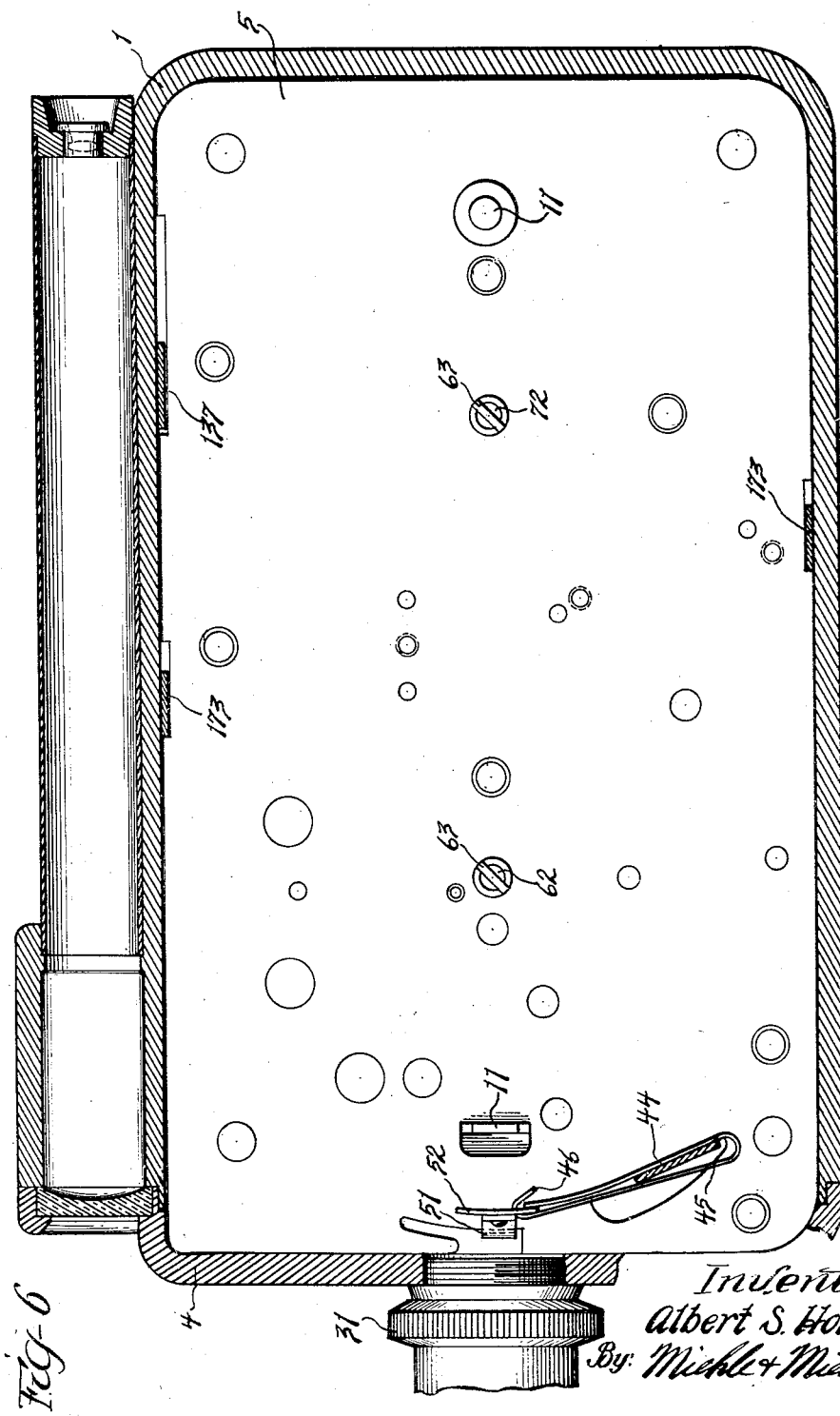

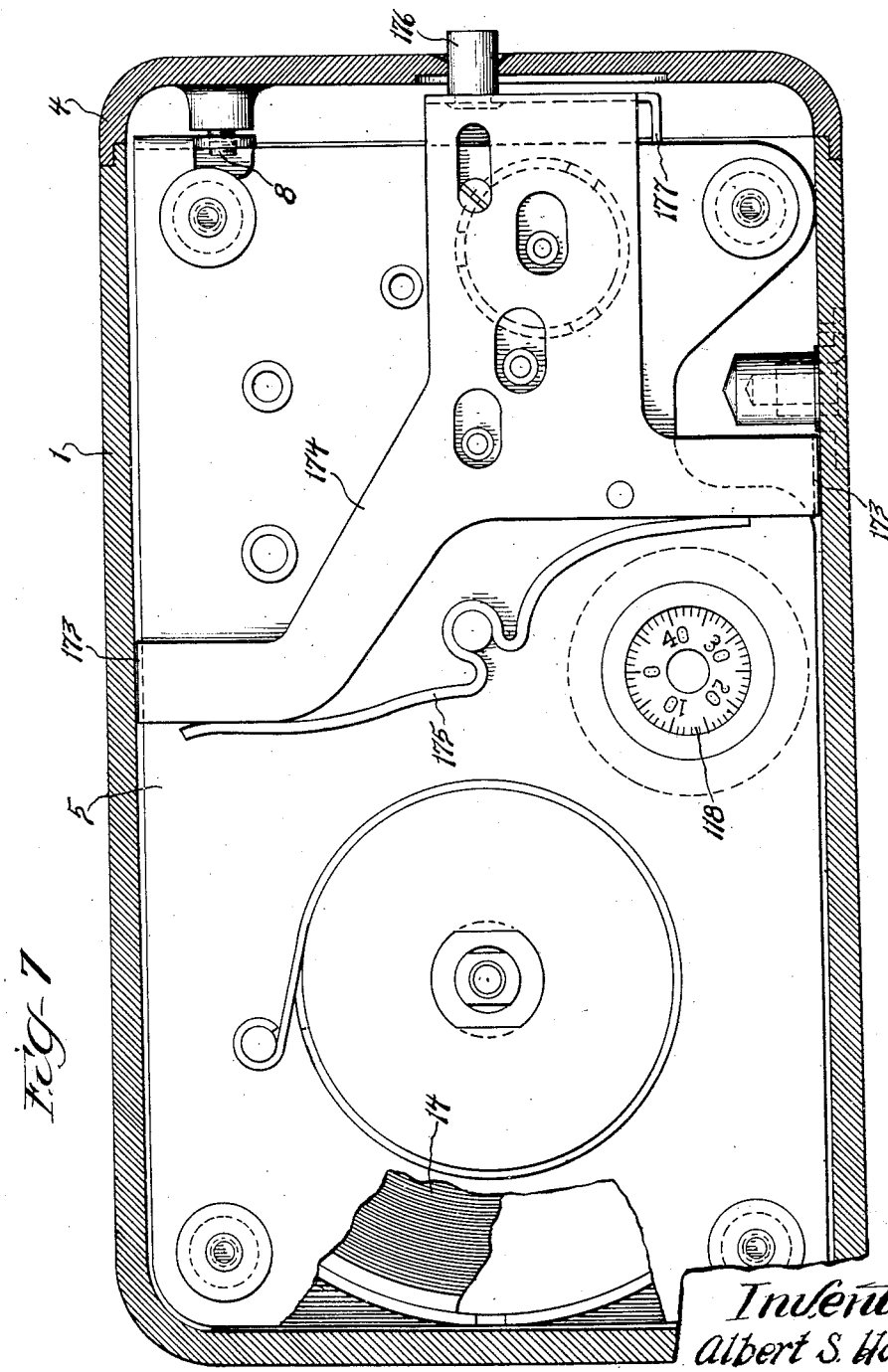

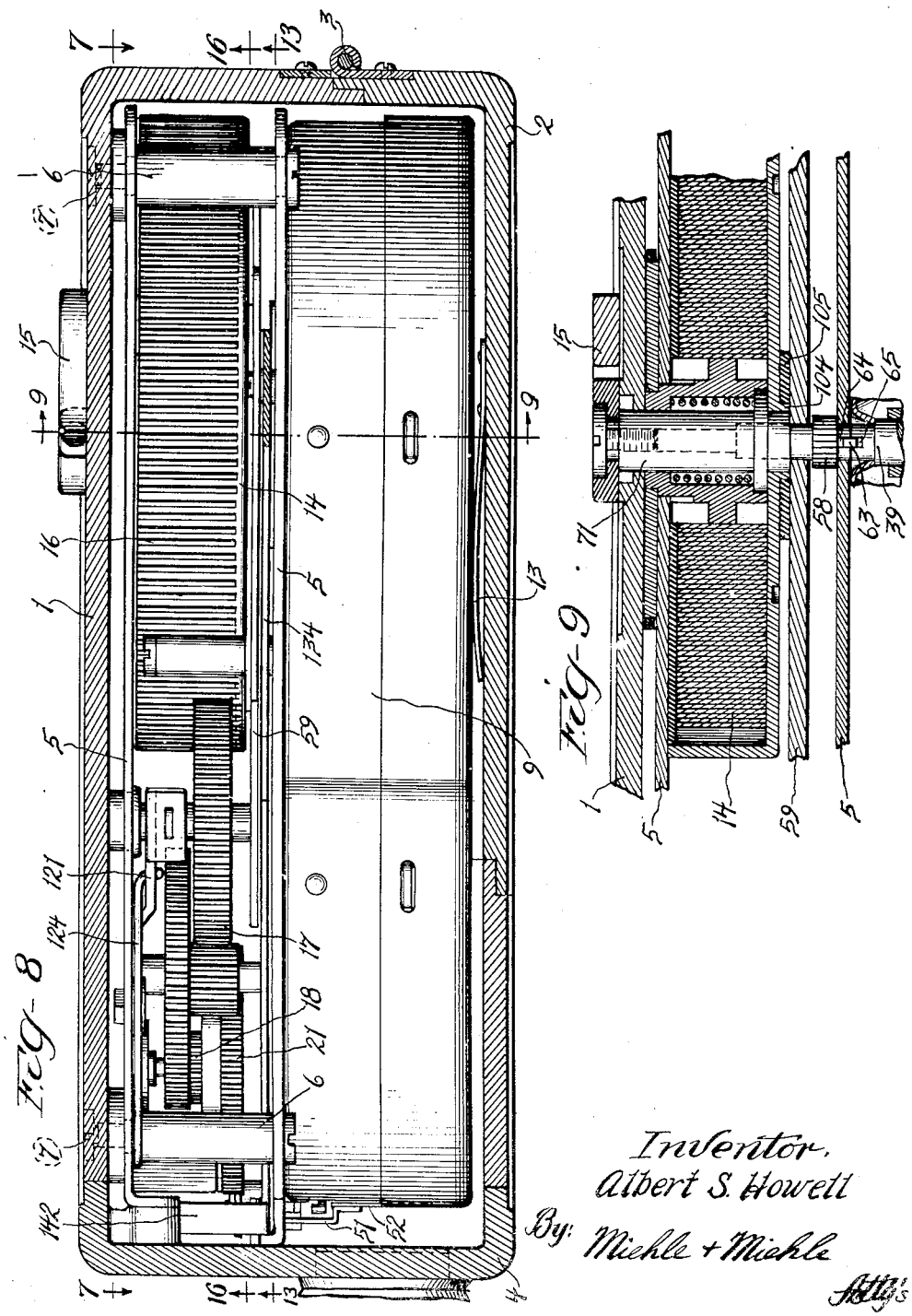

Jan. 21, 1936.  A. S. HOWELL  2,028,608
MOTION PICTURE CAMERA AND THE LIKE
Filed Jan. 12, 1931  12 Sheets-Sheet 6

Inventor:-
Albert S. Howell
By:- Miehle & Miehle
Atty's

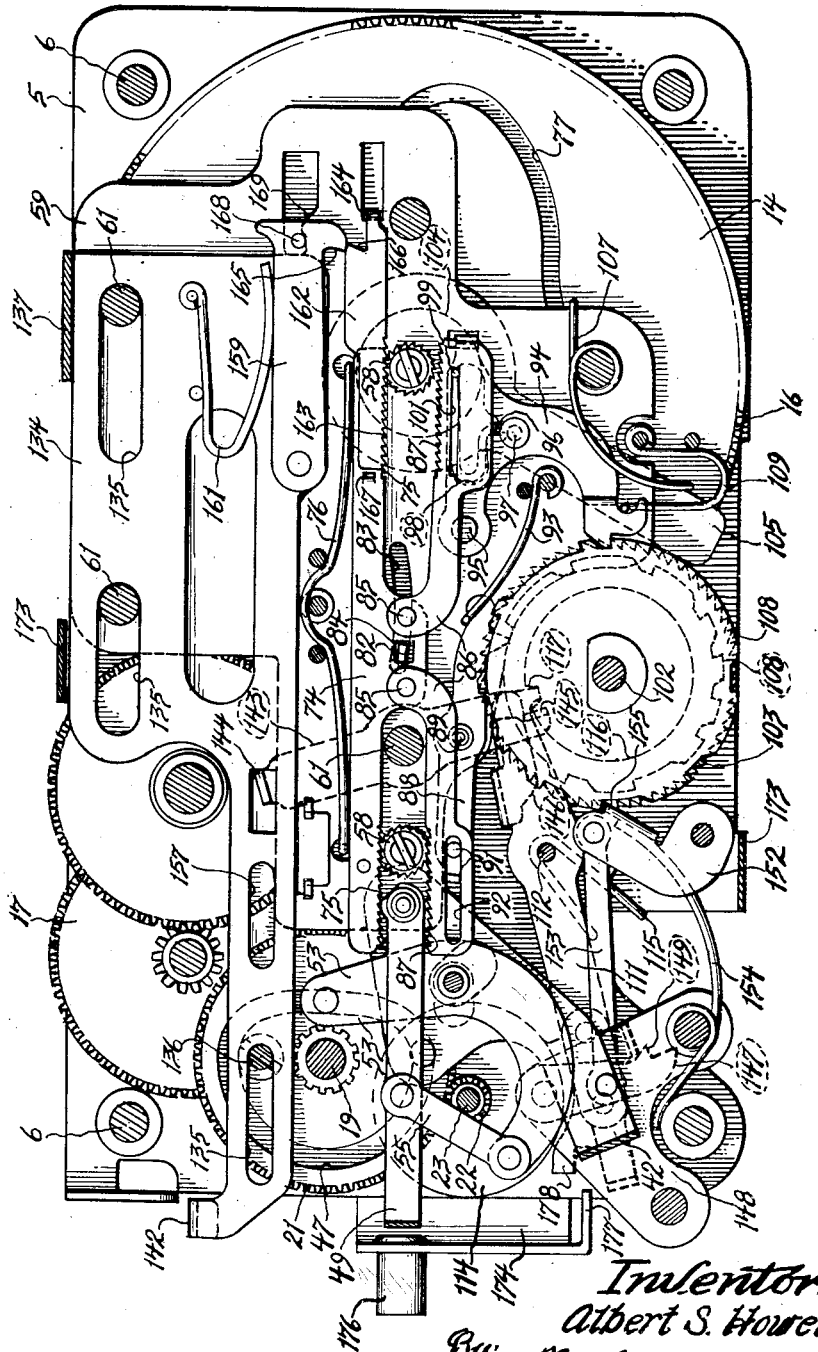

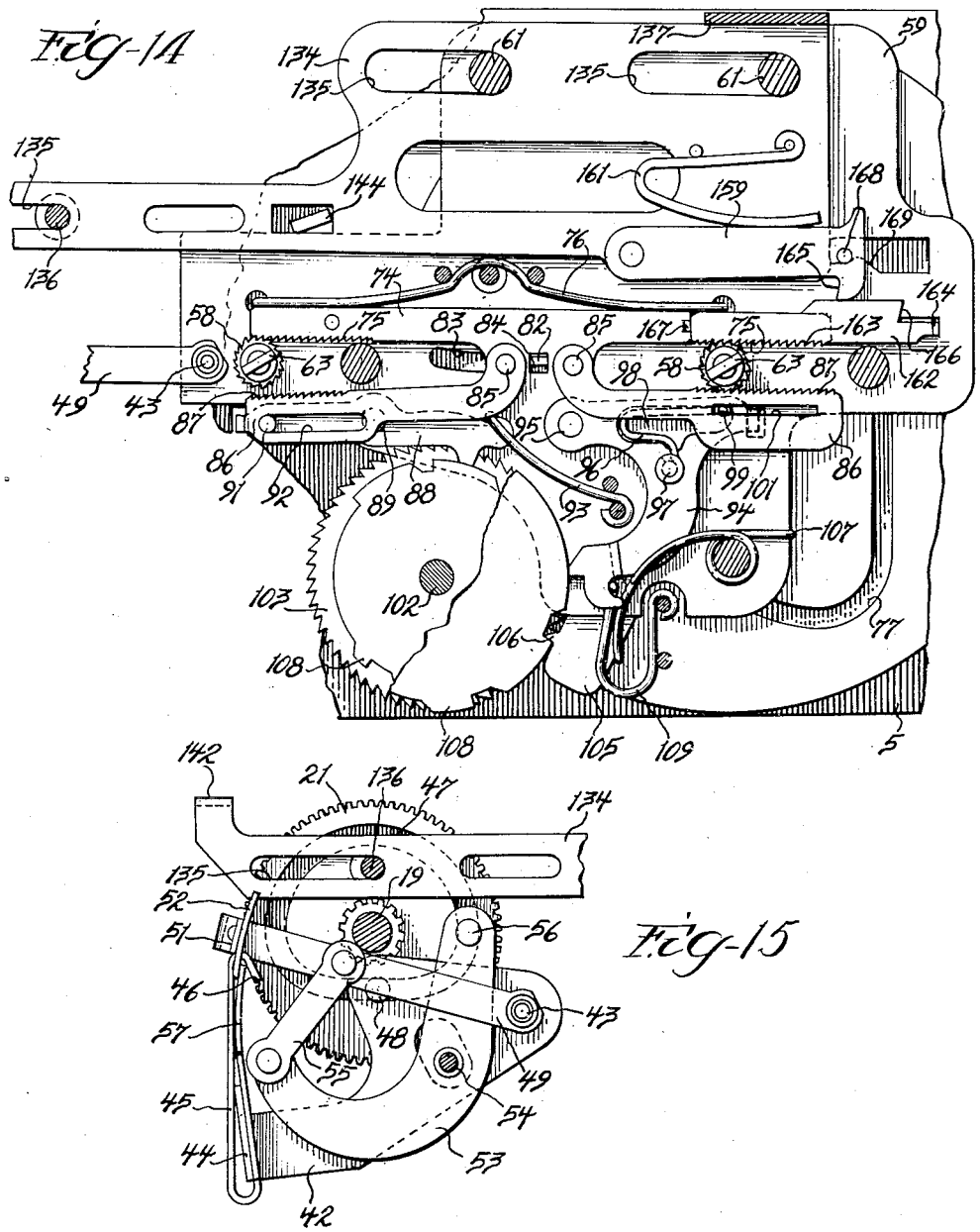

Jan. 21, 1936.　　　　　A. S. HOWELL　　　　　2,028,608
MOTION PICTURE CAMERA AND THE LIKE
Filed Jan. 12, 1931　　　12 Sheets-Sheet 9
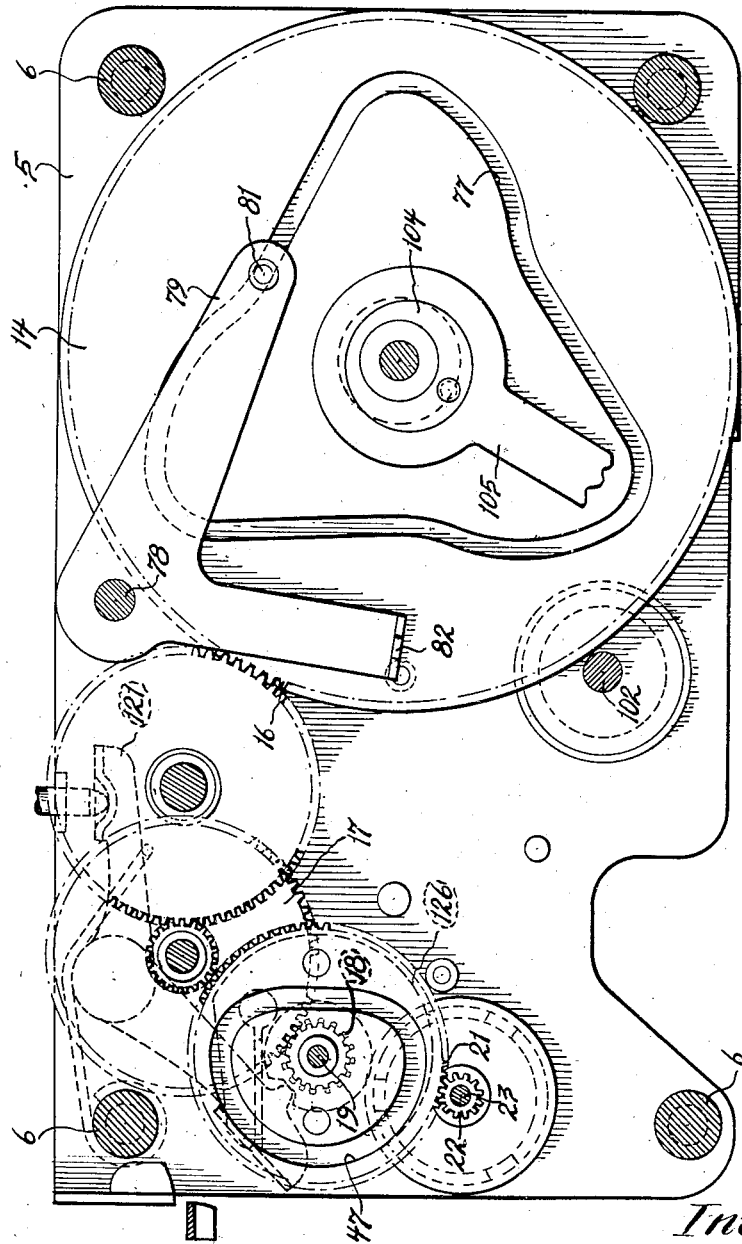
Inventor.
Albert S. Howell
By: Miehle & Miehle
Attys

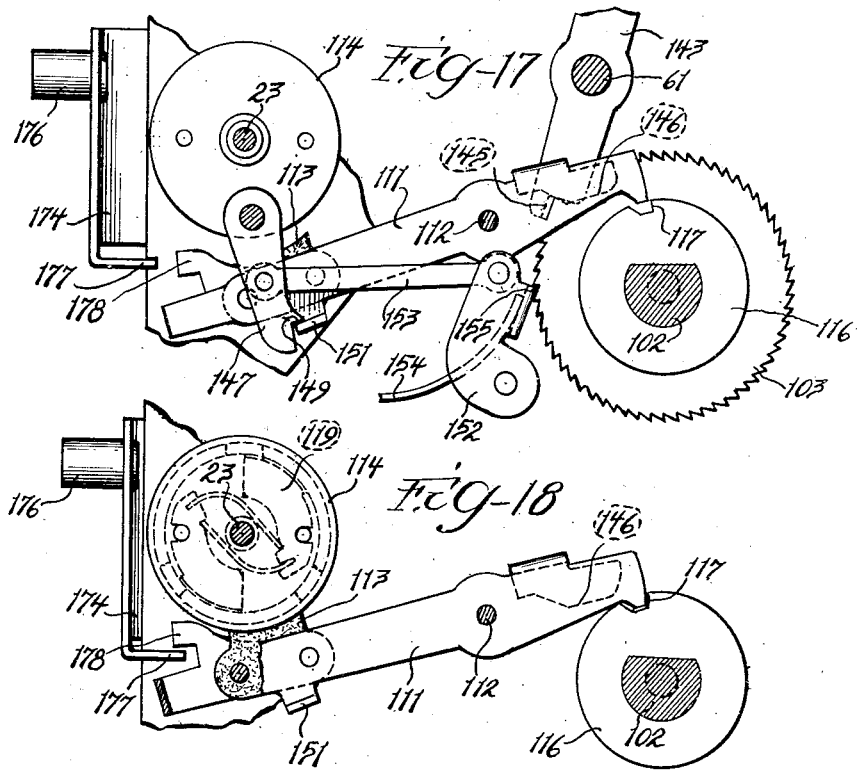

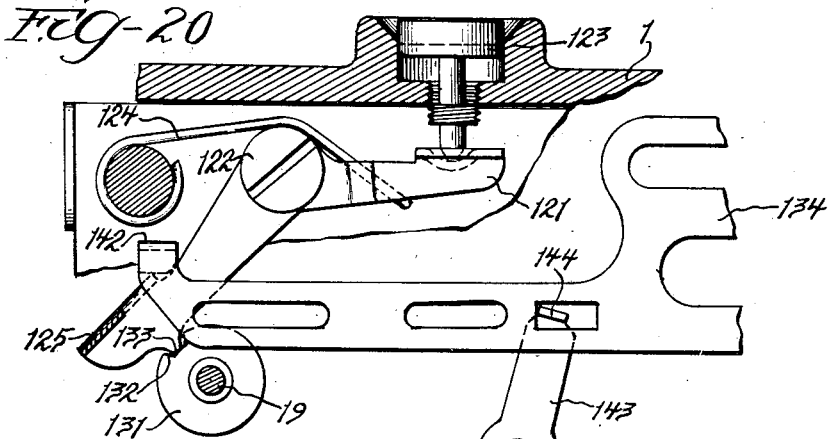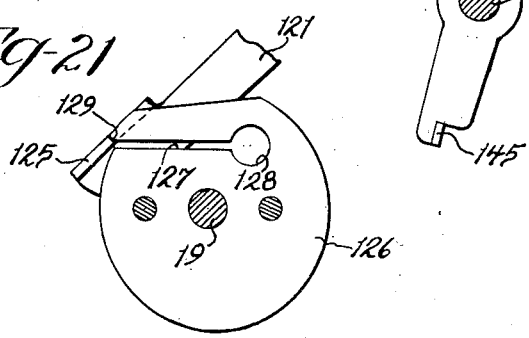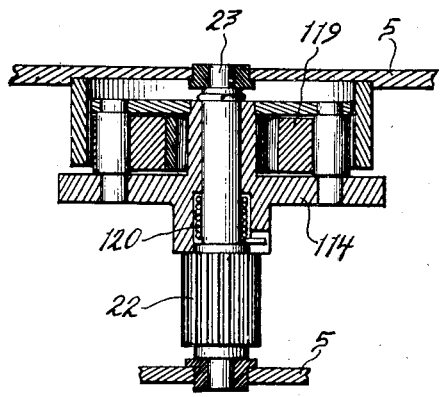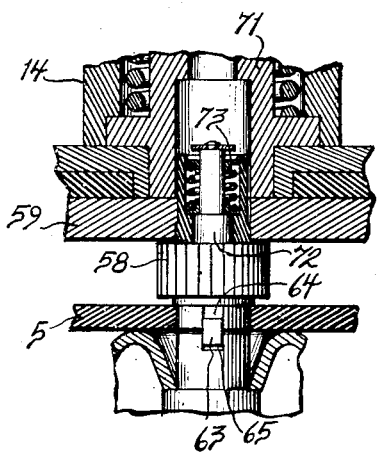

Jan. 21, 1936.  A. S. HOWELL  2,028,608
MOTION PICTURE CAMERA AND THE LIKE
Filed Jan. 12, 1931  12 Sheets-Sheet 12
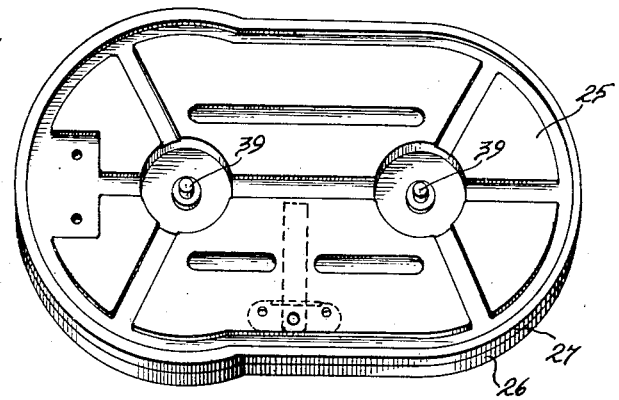
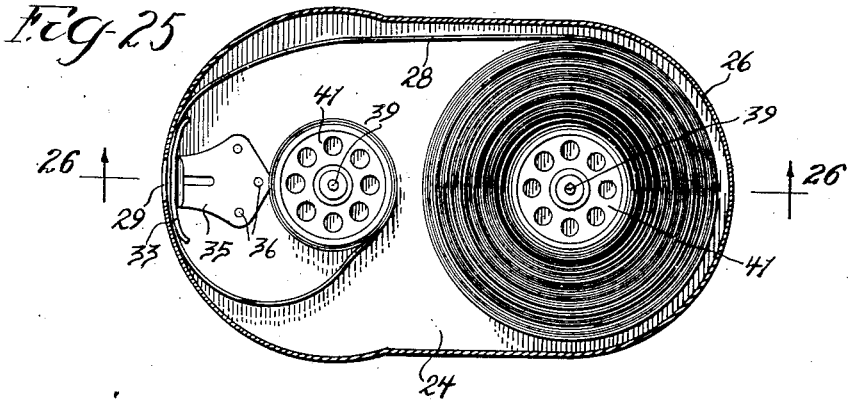
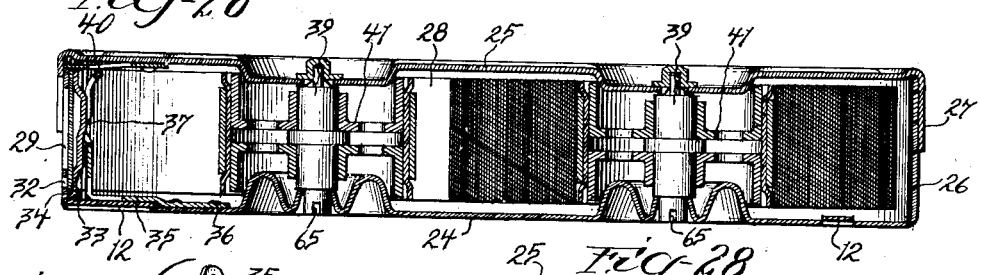
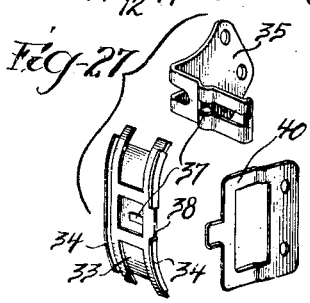
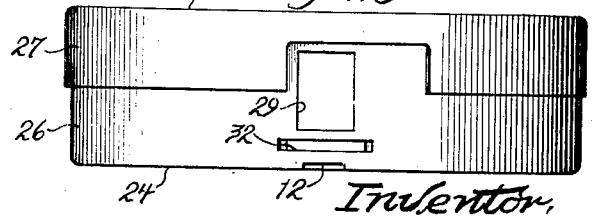

Patented Jan. 21, 1936

2,028,608

UNITED STATES PATENT OFFICE 2,028,608

MOTION PICTURE CAMERA AND THE LIKE

Albert S. Howell, Chicago, Ill., assignor to The Bell & Howell Company, Chicago, Ill., a corporation of Illinois Application January 12, 1931, Serial No. 508,027

25 Claims. (Cl. 88—18.4)

My invention relates particularly to motion picture cameras of the spring driven or "field" type although not limited to this use alone.

The general object of my invention resides in the provision of a novel motion picture camera which is compact, efficient, and convenient particularly with reference to the loading and unloading of film, and all with a view toward satisfactory nonprofessional use.

With this object in view my invention consists in certain features of novelty in the construction, combination and arrangement of parts by which the said object and certain other objects, hereinafter appearing, are effected, all as fully described with reference to the accompanying drawings and more particularly pointed out in the appended claims.

In the said drawings—

Figure 3 is a front elevation of the same;

Figure 4 is a rear elevation of the same;

Figure 5 is a partial bottom elevation of the same with the cover of the casing in open position;

Figure 6 is an enlarged central vertical forwardly and rearwardly extending section of the camera;

Figure 7 is an enlarged section of the camera on the line 7—7 of Figure 8;

Figure 8 is an enlarged top plan view of the camera with the casing thereof broken away and shown in section;

Figure 9 is a partial section on the line 9—9 of Figure 8;

Figure 13 is an interior sectional view substantially on the line 13—13 of Figure 8;

Figure 14 is a partial view similar to Figure 13 and showing parts in different positions of their movements;

Figure 15 is a partial view similar to Figure 13 showing the intermittent film feed and exposure shutter mechanism of the camera;

Figure 16 is a partial sectional view substantially on the line 16—16 of Figure 8;

Figures 17 and 18 are similar interior sectional views in side elevation of the automatic stop mechanism of the camera and showing the parts in different positions;

Figure 19 is an interior sectional view in side elevation showing the intermittent film feed and exposure shutter mechanism in a different position than that in which it is shown in Figure 15;

Figure 20 is an interior sectional view in side elevation showing a portion of the greater portion of the manually controlled starting and stopping mechanism of the camera;

Figure 21 is an interior sectional view in side elevation showing the remainder of the manually controlled starting and stopping mechanism of the camera;

Figure 22 is an axial section of the centrifugal speed governor of the camera;

Figure 23 is an axial section of one of the firm roll drive spindles of the camera;

Figure 24 is a perspective view of the interchangeable film magazine of the camera;

Figure 25 is a side elevation of the magazine with the cover thereof removed;

Figure 26 is an enlarged section on the line 26—26 of Figure 25;

Figure 27 is a perspective view of the several elements of the intermittent film feed exposure guide of the magazine; and, Figure 28 is an enlarged front elevation of the magazine.

Like characters designate like parts in the several views.

Figure 1:
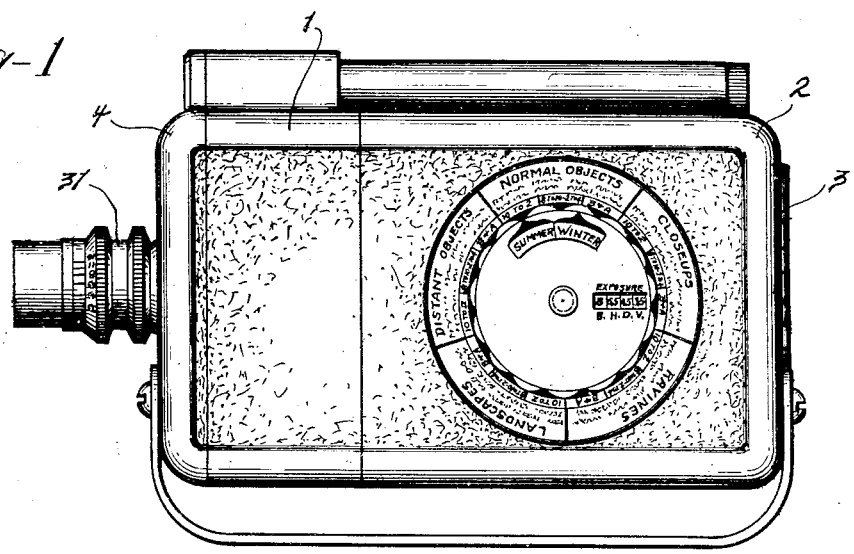
Figure 1 is a side elevation of a motion picture camera embodying my invention.

Referring to the drawings, the casing of the camera is of rectangular form elongated forwardly and rearwardly and consists of a main portion 1 open at the front and provided with a rearwardly disposed opening embracing portions of one side, the top, the bottom, and rear wall thereof, a cover 2 forming these portions of said walls to close said opening and hinged, as designated at 3, at the rear wall portion of the casing for opening and closing movement, and a front wall portion 4 detachably secured on the front of the main portion and forming the front thereof. See Figures 1 to 5 inclusive, and 8.

Arranged within the casing adjacent and parallel to the closed wall of the casing is a mechanism frame of rectangular forwardly and rearwardly elongated shape, consisting of parallel frame plates 5 secured in spaced relation by spacing devices 6, this frame being insertable in and removable from the casing through the open front end of the main portion 1 while the front wall portion 4 is removed. See Figures 3, 4 and 8. The mechanism frame is secured to the adjacent side wall of the main portion 1 by means of screws 7, and the front wall portion 4 is secured to the main portion 1 and to the mechanism frame by screws 8. See Figures 3 and 8.

A forwardly and rearwardly extending chamber is formed between the mechanism frame and the side wall of the camera casing a part of which is formed by the cover 2, and disposed in this chamber is an interchangeable forwardly and rearwardly elongated film magazine 9 for containing sensitized film, the magazine being registered in predetermined position by means of projections 11 on the adjacent frame plate 5 of the mechanism frame engaging depressions 12 in the inner wall of the magazine, see Figures 6, 26 and 28, and a spring 13 on the inside of the side wall portion of the cover 2 urging the magazine against this frame plate when the door is closed, see Figure 8, the cover being latched in closed position by means hereinafter described.

The magazine 9 is insertable into the camera casing and removable therefrom through the rearwardly disposed opening of the main casing portion 1 when the cover 2 is in open position, as shown in Figure 5, by slanting the magazine, grasping of the rear portion of the magazine at the top and bottom thereof by the fingers of one's hand being permitted by reason of the rearward opening of the camera casing embracing the rear portion of the top and bottom walls of the casing, the fact that this opening of the camera casing embraces portions of the rear and the adjacent portion of a side wall of the casing permitting the necessary slanting of the magazine.

Thus, it will be observed that the magazine is insertable into and removable from the camera casing with forward and rearward movement, this movement being adapted to mechanism at the front of the magazine chamber, hereinafter described, and the front portion of the side wall of the casing forming the magazine chamber desirably overlying this mechanism.

Figure 2:
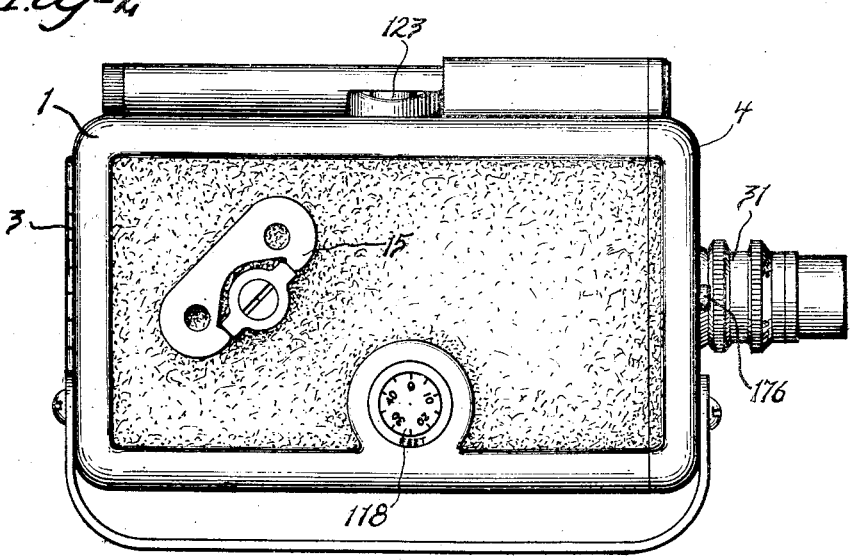
Figure 2 is an opposite side elevation of the same.

Carried on the mechanism frame between the frame plates 5 at its rear end is a spiral spring motor disposed on a transverse axis, generally indicated at 14, see Figures 7, 8 and 9, which is wound by means of a handle 15 on the exterior of the adjacent side wall of the camera casing, see Figures 2, 8 and 9.

The casing of the spring motor forms the driving member thereof and has formed, on the periphery thereof, a spur gear 16. See Figures 8, 13 and 16. Carried on the mechanism frame and extending forwardly from the spring motor is an increasing movement spur gear train, generally indicated at 17, comprising gears disposed on transverse axes being the frame plates 5. The rearward gear of this gear train meshes with the gear 16 so that the gear train is driven from the spring motor 14, and the forward portion of the gear train comprises a pinion 18 secured on a cam shaft 19 arranged adjacent the front of and intermediate the top and bottom of the mechanism frame, and a large spur gear 21 secured on the cam shaft and meshing with a pinion 22 secured on a governor shaft 23 disposed below the cam shaft.

The film magazine 9 has the front and rear ends thereof semicircular in form on spaced axes normal to the plane thereof, and is formed of a body member 24 and a cover member 25, these members being provided with engaged edge flanges 26 and 27 of which the flange 26 forms the edge wall of the magazine. See Figures 24, 25, 26 and 28.

The film magazine is provided at its front end with an intermittent film feed exposure guide curved correspondingly with the front wall portion thereof and through which a motion picture film 28 in the magazine passes. This exposure guide consists as follows.

The front wall portion of the magazine is provided with an intermediately disposed exposure aperture 29 alined with a photographic lens 31 mounted in an aperture in the front wall portion 4 of the camera casing, and is further provided with a vertically extending feed slot 32 therethrough between the aperture 29 and the inner side of the magazine and alined with the usual marginal feed perforations in the film.

A guide member 33, within the magazine and curved correspondingly with the front wall portion of the magazine, is arranged in underlying relation with said front wall portion and with the apertured portion thereof and light traps the apertures 29 and 32 from the interior of the magazine. See Figures 25 to 28 inclusive.

The guide member 33 is provided with longitudinal edge flanges 34 engaging against the inner face of the front wall portion of the magazine and is held in position by a spring 35 secured against the inner face of the straight wall of the body member 24 of the magazine, as designated at 36, and having an upstanding portion interlocked, as designated at 37, with the intermediate portion of the guide member 33 to yieldably urge the guide member toward the front wall portion of the magazine and to positively position the guide member longitudinally, this construction permitting convenient assembly and removal of the guide member for cleaning and movement of the guide member away from said front wall portion for lacing film in the guide formed by said guide member and said front wall portion.

The intermediate edge portion of the guide member 33 adjacent the cover member 25 of the magazine is interrupted, as designated at 38, and a flat spring 40 is secured on the cover member and extending through the interruption 38 engages the adjacent edge of the film in the guide to exert edge pressure thereon, it being observed that this spring is removed from the guide with removal of the cover member 25 from the body member 24 for loading the magazine.

The magazine 9 is provided with two forwardly and rearwardly spaced revoluble film roll spindles 39 therein which are disposed on the axes of the semicircular ends of the magazine, and fixed on these spindles are film spools 41 on which are carried the feed and rewind rolls of the film, the forward spool carrying the feed roll and the rearward spool carrying the rewind roll. See Figures 25 and 26.

The axes of the spindles 39 and accordingly the axes of the semicircular ends of the magazine are spaced less than the diameter of a full roll of film thereon to decrease the dimension of the magazine in the axial plane of the spindles, this being permissible in that as one film roll increases the other decreases in diameter.

The arrangement of the intermittent feed guide at the front end of the magazine with the axes of the film rolls disposed in forwardly and rearwardly spaced relation is conducive, as shown, of a forwardly and rearwardly elongated camera casing and effects stretches of film of adequate length between the intermittent feed guide and the film rolls for compensating the intermittent feed of the film in the guide, with particular advantage in the construction shown in which the film is fed directly between the guide and the film rolls as will be hereinafter described.

The exposure guide 33 cooperates with an intermittent film feed and exposure device of the camera mechanism now to be described.

A shuttle lever 42 is pivotally mounted substantially on the axis of the front wall portion of the magazine, as designated at 43, and disposed to the inside of the magazine on the adjacent frame plate 5. See Figures 13, 15, and 19. This shuttle lever extends forwardly from the pivot mounting 43 and is provided at its front end with a portion 44 projecting transversely in front of the magazine and to which is attached a spring member 45 bent on itself and provided at the free end thereof with a ratchet tooth 46 projecting rearwardly through the feed slot 32 of the magazine and having a ratchet engagement with the perforations of the film in the exposure guide to intermittently feed the film downwardly in the guide with oscillation of the shuttle.

The adjacent face of the gear 21 on the cam shaft 19 is provided with a cam groove 47, and a stud 48 mounted intermediately on the shuttle lever 42 is engaged in this cam groove for oscillating the shuttle lever with rotation of the gear 21.

Also pivoted at the mounting 43 in coaxial relation with shuttle 42 and disposed to the inside of the magazine is a shutter lever 49 which extends forwardly and is provided at its front end with a portion 51 projecting transversely in front of the magazine and to which is fixed a shutter 52 arranged to interrupt the photographic light between the photographic lens 31 and the film in the exposure guide at the exposure aperture 29 with oscillation of the shutter lever.

A lever 53 is intermediately pivoted on the adjacent frame plate 5 in parallelism with the pivotal axis of the shutter lever 49, as designated at 54, and has its forward end operatively connected with the intermediate portion of the shutter lever by means of a link 55 pivotally connected with both of these levers, so that oscillation of the lever 53 effects oscillation of the shutter lever. A stud 56 mounted on the other end of the lever 53 is engaged in the cam groove 47 at a point spaced from the engagement of the stud 48 with the cam groove for oscillating the shutter in timed relation with the oscillation of the shuttle lever.

A second shutter 57 is secured on the transversely projecting portion 44 of the shuttle lever 42 which in the oscillation of the shuttle lever intermittently interrupts the photographic light between the photographic lens and the film in the exposure guide at the exposure aperture 29.

Figure 10:
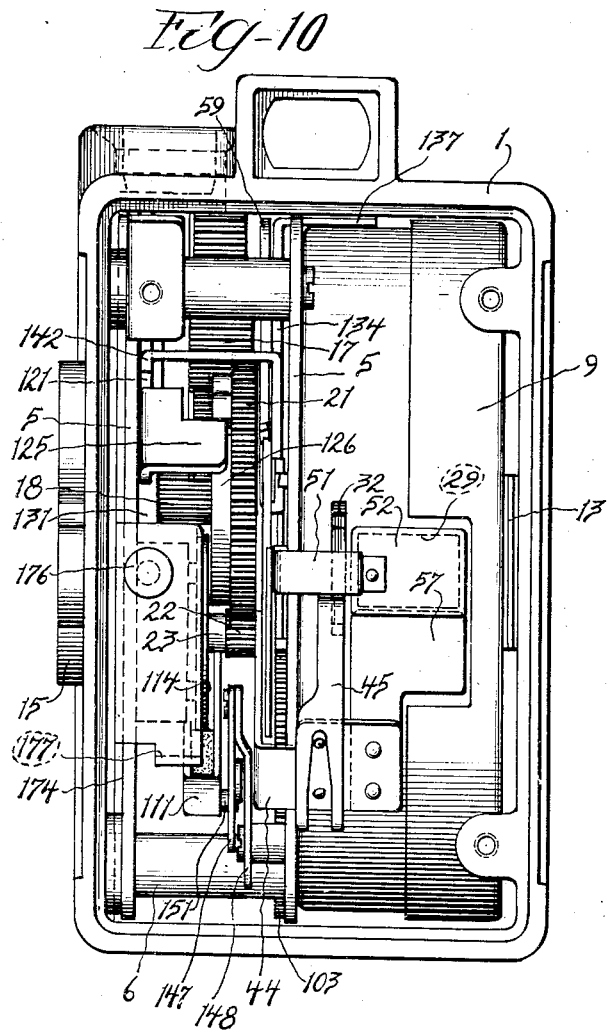
Figure 10 is a front elevation of the camera with the front piece of the casing removed.

The shutters 52 and 57 cooperate in intermittently exposing the film at the aperture 29 and the timing of the oscillations thereof is such that, at the initiation of the downward or film feeding movement of the shuttle lever 42, the shutters are in slightly overlapped continuing relation with the shutter 57 extending above the shutter 52, and the shutter 52 overlying the exposure aperture 29, see Figure 15, and this relative position is maintained during the entire downward or film feeding stroke of the shuttle lever. At the termination of this stroke of the shuttle lever the shutter 57 covers the exposure aperture 29, the shutter 52 having moved to a position below the exposure aperture. See Figure 10.

Following this the shuttle lever 42 dwells in its lower position by reason of the stud 48 passing through the dwell portion of the cam groove 47 while the shutter 52 is moved upwardly to expose the film at the exposure aperture 29.

After the shutter 52 reaches its upper position, as shown in Figure 19 it dwells there by reason of the stud 56 passing through the dwell portion of the cam groove 47 while the shuttle lever 42 is moved upwardly and with it the shutter 57 to shut off the light at the exposure aperture 29 and the feed member 45 on its return or non-feeding movement.

At the end of this operation the cycle of the feed and exposure mechanism is completed, the parts being in the position as shown in Figure 15 preparatory to another cycle.

Thus is provided a simple and effective intermittent film feed and exposure mechanism which is well adapted for the general design of the camera shown and which effects the exposure light cut off and cut on in the same direction with oscillating means to effect a uniform exposure over the area of the exposure aperture.

The film in the magazine 9 is fed to and from the film rolls and the exposure guide in the following manner.

The inner ends of the film roll spindles 39 have detachable clutch engagements with revoluble film roll drive spindles carried with the camera mechanism, the film roll drive spindles being coaxial with the spindle 39 when the magazine is mounted in the camera, these detachable clutch engagements providing for the insertion and removal of the magazine.

The forward film roll drive spindle which drives the forward or rewind roll in the magazine consists as follows. See Figures 11 and 13. An axially bored ratchet pinion 58 extends between and is rotatably mounted in bores through the inner frame plate 5 and an additional frame plate 59 arranged between the frame plates 5 and secured in adjacent parallelism with the inner frame plate 5 by means of spacing studs 61. A stud 62 is slidably engaged in the bore of the pinion 58, and secured on the end of this stud adjacent the magazine chamber of the camera is a diametrically arranged clutch member 63 which is slidably engaged in a diametrical slot 64 in the adjacent end of the pinion 58 to provide a drive connection therebetween and to permit longitudinal movement of the stud 62 and clutch member 63 with reference to the pinion.

Each of the film roll spindles 39 is provided at its inner end with a diametrical clutch slot 65, the slot of the forward spindle 39 being detachably engageable with the clutch member 63 to form a driving connection and the stud 62 and clutch member 63 being retractible away from engagement with the slot 65 of this spindle to permit rearward and forward movement of the magazine for insertion or removal of the magazine 9.

Figure 11:
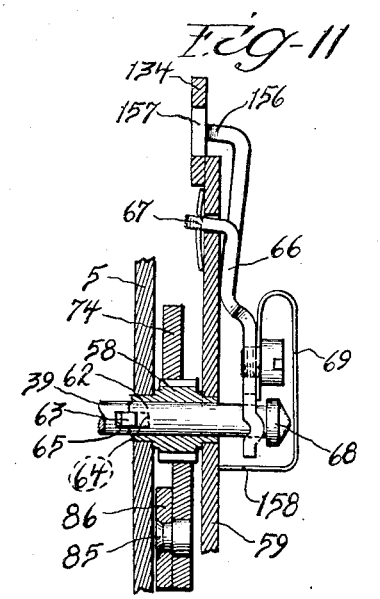
Figure 11 is a partial sectional view substantially on the line 11—11 of Figure 12.

The longitudinal position of the stud 62 and the clutch member 63 is controlled through the following structure. See Figures 11 and 12. A lever 66 is pivoted on the frame plate 59, as designated at 67, and one end thereof is bifurcated and engages under a head 68 on the stud 62 for retracting it and the clutch member 63. Normally this lever is maintained in a position, as shown in Figure 11, to permit the stud and clutch member to be positioned to engage the slot 65 of the forward spindle 39, a spring 69 yieldably urging the stud into clutch engaging position. Control of the lever 66 in its movement is effected by means hereinafter described.

The rear film roll drive spindle which drives the rear or film feed roll in the magazine consists as follows. See Figures 9, 13 and 23. A second axially bored ratchet pinion 58, spaced rearwardly from the aforementioned pinion 58 extends between and is rotatably mounted in bores through the inner frame plate 5 and the frame plate 59. This pinion is disposed coaxially with the spring motor 14 and the hub thereof projects into an axially bored hub 71 of the spring motor. See Figure 23.

A stud 72 is slidable in the bore of the second pinion 58, and secured on the end of this stud adjacent the magazine chamber of the camera is a second diametrically arranged clutch member 63 which is slidably engaged in a second diametrical slot 64 in the adjacent end of the second pinion 58 to provide a drive connection therebetween and to permit longitudinal movement of the stud 72 and its clutch member 63 with reference to this pinion. A helical compression spring 73 is arranged in an enlargement at the inner end of the bore of said second pinion 58 and reacting thereagainst yieldably urges the stud 72 and its clutch member 63 into engaging relation with the clutch slot 65 of the rear film roll spindle 39, the yielding of this stud and clutch member permitting positioning of the magazine in the camera when the clutch member and slot are not in alinement, engagement thereof being effected with rotation of this drive spindle.

The film roll drive spindles are driven from the camera mechanism to effect the feeding of the film at the film rolls at a substantially uniform rate corresponding with the rate of feed of the film by the intermittent feed mechanism in the following manner. See Figures 13, 14 and 16.

Slidably mounted on the frame plate 59 for rearward and forward movement and disposed between this frame plate and the inner frame plate 5 is a forwardly and rearwardly extending ratchet bar 74, ratchet teeth 75 of which are yieldably engaged downwardly on the teeth of the pinions 58 of the film roll drive spindles by means of a spring 76 intermediately secured on the frame plate 59 and having the ends thereof engaged against the ratchet bar, so that the pinions 58 are intermittently rotated in one direction as the ratchet bar is reciprocated.

The casing of the spring motor 14 is provided on the face thereof adjacent the frame plate 59 with a cam groove 77, and pivotally mounted at the angle thereof on the frame plate 59, as designated at 78, and disposed in a plane between this frame plate and the spring motor casing is a bell crank 79, one end of which is provided with a stud 81 engaged in the cam groove 77 to oscillate the bell crank as the motor casing rotates to drive the camera mechanism. The other end of this bell crank is turned transversely, as designated at 82, and, projecting through an arcual aperture 83 in the frame plate 59, engages in an aperture 84 in the intermediate portion of the ratchet bar 74 to reciprocate the same to intermittently rotate the film roll drive spindles, the film roll spindles 39, the film spools 41 and the film rolls thereon at a uniform angular rate with operation of the camera mechanism.

This driving mechanism for the film rolls effects a minimum uniform angular rate of drive of the film rolls and cooperating therewith is additional film roll driving mechanism for effecting uniform feed movement of the film at the film rolls corresponding with the rate of feed of the film by the intermittent feed mechanism, which will now be described. See Figures 13, 14 and 16.

Pivotally mounted, as designated at 85, on the intermediate portion of the ratchet bar 74 are two additional ratchet bars 86. One of these ratchet bars 86 extends forwardly from its pivot mounting, ratchet teeth 87 of which are yieldably engaged upwardly on the teeth of the forward pinion 58 by means of a lever 88 intermediately pivoted on the frame plate 59, as designated at 89, and having a stud 91 at its forward end slidably engaged in a longitudinal slot 92 in the forward ratchet bar 86 and a spring 93 having one end secured with the frame plate 59 and having its other end engaged with the rear end of the lever 88 to yieldably urge this ratchet bar upwardly against the forward pinion 58.

The other of the ratchet bars 86 extends rearwardly and ratchet teeth 87 of this bar are yieldably engaged upwardly on the teeth of the rear pinion 58 by means of a lever 94 pivoted on the frame plate 59, as designated at 95, and positioned as hereinafter described and having a spring 96 secured at one end on this lever, as designated at 97, this spring having a portion bent on itself and arranged in a suitable recess 98 in the lever and having the free end thereof projecting transversely, as designated at 99, and slidably engaged in a longitudinal slot 101 in the rear ratchet bar 86, the lever 94 being positioned in its pivotal movement in a manner hereinafter described.

In the reciprocation of the ratchet bar 74 the ratchet bars 86 are reciprocated therewith, the stud 91 slidably engaged in the slot 92 and the spring end 99 slidably engaged in the slot 101 providing for such reciprocation, and when these ratchet bars are engaged with the pinions 58 they provide an additional driving means cooperating with the driving means provided by the ratchet bar 74 of itself for driving the film rolls at a fast or maximum rate, this additional driving means being adapted to be rendered inoperative independently with reference to the film rolls and being controlled with respect thereto in a manner now to be described.

Extending between the frame plates 5 and journaled therein is a revoluble shaft 102 on which is secured a ratchet wheel 103. See Figures 13 and 14. The spring motor casing is provided at the side thereof adjacent the frame plate 59 with an externally eccentric hub 104, see Figures 16 and 23, upon which is journaled a bored end of a bar 105. The bar 105 extends downwardly from this hub and is provided with a ratchet tooth 106 which is yieldably urged into engagement with the ratchet wheel 103 by a spring 107 secured to the frame plate 59 and engaging the bar 105 adjacent the lower end thereof. Thus, as the spring motor casing rotates in the operation of the camera mechanism, the bar 105 reciprocates and in its ratchet engagement with the ratchet wheel 103 effects rotation of the shaft 102 at a slow rate or, as shown, one revolution for the run of the film in the magazine of the camera. See Figures 13 and 14.

Secured on the shaft 102 are two cams 108, one of which is engaged by the rear end of the lever 88 under the influence of the spring 93 and the other of which is engaged by a free end of the lever 94 under the influence of a spring 109 secured on the inner frame plate 5 and engaging with a free end the aforesaid free end of the lever 94 to yieldably urge it against its cam 108.

The cams 108 are provided with alternating high and low parts, and when the lever 88 is engaged in a low part of its cam, as shown in Figure 13, the forward ratchet bar 86 is engaged with the forward drive pinion 58 and when engaged in a high part of this cam, as shown in Figure 14, this ratchet bar is inoperative upon this pinion. When the lever 94 is engaged in a low part of its cam 108, as shown in Figure 13, the rear ratchet bar 86 is inoperative upon the rear pinion 58 and when engaged in a high part, as shown in Figure 14, this ratchet bar is operative upon this pinion.

The cams 108 as they are rotated with the camera mechanism intermittently render the ratchet bars 86 inoperative independently with reference to the pinions 58 in opposite progressively varying manners, to accommodate for the decreasing diameter of the feed roll and the increasing diameter of the rewind film roll as the camera is operated thereby maintaining a substantially uniform and equal feed movement of the film at the rolls corresponding with the rate of feed of the film by the intermittent feed mechanism.

As aforesaid, the shaft 102 is a one revolution shaft, that is, it makes one revolution for the run of film in the magazine, and in order that the cams 108 are properly positioned when a magazine is placed in the camera preparatory to exposing the film in the magazine, the following is provided.

A lever 111 is intermediately pivoted, as designated at 112, on the mechanism frame between the frame plates 5 and forwardly of the cam shaft 102. See Figures 13, 17 and 18. The forward end of this lever is provided with a brake shoe 113 engageable upwardly against a brake disk 114 arranged on and driven by the governor shaft 23 to stop operation of the camera mechanism, and a spring 115 operates on this lever to move the same into braking or stopping position, as shown in Figure 18.

Fixed on the cam shaft 102 is a disk 116 which is operative to normally maintain the lever 111 in inoperative or nonstopping position, as shown in Figure 17. The disk 116 is provided with a depression 117 into which the rear end of the lever 111 engages when the cam shaft 102 completes a revolution to engage the shoe 113 against the drum 114 to stop the camera mechanism, the length of the film in the magazine being such that it is completely exposed during the predetermined run of the camera mechanism corresponding with one revolution of the cam shaft.

Thus as the camera mechanism is thus automatically stopped, the cam shaft is positioned preparatory to the removal of the magazine of exposed film and the insertion of another magazine containing unexposed film and the exposure thereof.

A film footage indicator 118 is desirably secured on the cam shaft 102 and is visible from the exterior of the camera casing. See Figure 2.

A centrifugal speed governor, generally indicated at 119, see Figures 18 and 22, is associated with the governor shaft 23 and has its rotor fixed on the brake disk 114 for effecting a uniform speed of operation of the camera mechanism, the brake disk being driven from the cam shaft by means of a coaster clutch 120, see Figure 22, which permits overrunning of the brake disk and the rotor of the governor when the camera mechanism is stopped by the manually controlled starting and stopping mechanism now to be described.

A manually controlled starting and stopping mechanism is provided for starting and stopping the camera mechanism at will during the aforesaid predetermined run of the camera mechanism and consists as follows.

A lever 121 is intermediately pivoted, as designated at 122, see Figure 20, on the outer frame plate 5 adjacent the upper forward corner thereof, and a push button 123, manually accessible from the exterior of the camera casing, see Figures 2 and 20, is mounted for vertical movement in a bore through the top of the camera casing and bears downwardly on the rear end of the lever 121 for the manual actuation of this lever in the corresponding direction, a spring 124 being operative upon this lever to actuate it and the push button in the opposite direction.

The forward portion of the lever 121 overlies the cam shaft 19 and is provided with a transversely extending stop portion 125 which overlies a disk 126 fixed on this cam shaft. See Figures 10 and 21. This disk is provided with a slot 127 extending inwardly from the periphery thereof on a chord thereof and terminating at its inner end within said periphery with an enlargement 128, thus forming a somewhat yieldable stop formation, as designated at 129, engageable at its outer end with the stop portion 125 when the lever 121 is under the influence of the spring 124 to stop operation of the camera mechanism, as shown in Figure 21. Downward pressure on the push button 123 moves the stop portion 125 upwardly out of engagement with the stop formation 129 for operation of the camera mechanism.

Also fixed on the cam shaft 19 is a disk 131 having a diameter less than that of the disk 126, and the disk 131 is provided with a peripheral depression 132. See Figure 20. The lever 121 is provided adjacent its forward end with a downward projection 133 which peripherally engages the disk 126 to maintain the stop portion 125 out of engagement with the disk 126 and engages in the depression 132 to permit engagement of the stop portion 125 with the stop formation 129.

Accordingly, the stop portion 125 is held out of engagement with the disk 126 until the stop formation 129 is adjacent the stop portion 125, the disk 131 being smaller than the disk 126 so that its engagement with the projection 133 causes less frictional drag on the camera mechanism when the push button 123 is released with consequent decrease in slowing down of the camera mechanism before stoppage thereof.

Disposed between the frame plate 59 and the inner frame plate 5 and in parallelism therewith adjacent the frame plate 59, is a forwardly and rearwardly extending plate 134 which is mounted for forward and rearward movement by means of slots 135 therethrough engaging the upper studs 61 and a screw stud 136 at the forward end of the inner frame plate 5. See Figures 8 and 13.

This plate 134 is provided with a transverse extension 137 at the top rear corner thereof extending toward the rear opening of the casing, see Figure 5, and this extension is operatively connected with the cover 2 of the camera casing by means of a link 138 pivotally connected with the cover, as designated at 139, and having a longitudinal slot and stud pivot and sliding connection 141 with the extension 137, so that, upon final opening movement of the cover, the plate 134 is moved rearwardly, and upon final closing movement of the cover this plate is moved forwardly to the position shown in Figure 13.

The forward end of the plate 134 is provided with a transversely projecting portion 142 overlying the forward end of the lever 121, which portion engages the lever 121 to hold it in stopping position when the plate 134 is positioned rearwardly by the positioning of the cover 2 in open position, thus preventing operation of the camera mechanism by depression of the push button 123. See Figures 10 and 20. When the plate 134 is positioned forwardly, as shown in Figure 13, the portion 142 thereof is disengaged from the lever 121 to permit operation of the camera mechanism. Thus, when the cover 2 is open the push button starting and stopping mechanism is inoperative to start the camera mechanism and when the cover is closed this starting and stopping mechanism is operative to start and stop the camera mechanism.

A vertically arranged lever 143 is intermediately pivoted on the lower forward stud 61 and has its upper end turned transversely and engaged in an aperture through the plate 134, as designated at 144. See Figures 13 and 20. The lower end of the lever 143 is provided with a transversely projecting portion 145 which is adapted to engage under a cam portion 146 on the rear end of the brake lever 111 to move the same into brake released position with rearward movement of the plate 134 caused by opening of the cover 2, it being noted that this movement of the plate 134 locks the push button starting and stopping mechanism in stopping position so that release of the brake does not start the camera mechanism.

A latch lever 147 is pivotally mounted at its upper end on a bracket 148 disposed between the frame plates 5 and carried by the inner frame plate 5. See Figures 10 and 13. The lower end of this latch lever is provided with a latch formation 149 which is adapted to engage over a transverse projection 151 on the forward end of the brake lever 111 to maintain the brake lever in release or nonstopping position. See Figures 13 and 17.

A lever 152 is pivotally mounted at its lower end between the frame plates 5, and a link 153 has its ends pivotally connected with the levers 147 and 152 whereby the lever 152 is operatively connected with the lever 147. A spring 154 is secured on the mechanism frame and a free end thereof operates against the lever 152 to move it and the lever 147 rearwardly to yieldably urge the lever 147 against the projection 151 and to engage the latch formation 149 with this projection to lock the brake lever 111 in release position when the lever 143 so positions the brake lever.

The lever 152 is provided with a tooth formation 155 which engages in a tooth space of the ratchet wheel 103 when the latch formation 149 of the lever 147 engages the projection 151 to lock the brake lever in released position, and when the camera mechanism is started the adjacent tooth of the ratchet wheel cams the lever 152 forwardly to release the latch member from the brake lever, the brake lever then being maintained in release position engagement of the rear end of the brake lever with the disk 116, the depression 117 of this disk having moved out of registry with the disk engaging portion of the brake lever during release movement of the latch lever.

The mechanism just described functions during the interchange of magazines and its action is as follows.

When the film in the magazine has been completely exposed in the predetermined run of the camera mechanism the single revolution shaft 102 is at the end of its cycle, preparatory to another cycle, and the depression 117 having registered with the disk engaging portion of the brake lever, the brake lever 111 is operated by the spring 115 into braking or stopping position, thus stopping the camera mechanism.

The cover 2 is then opened, causing the brake lever 111 to be moved to released position in which it is locked by the latch lever 147, the push button starting and stopping mechanism being locked in stopping position at the same time. The magazine in the camera is removed and another magazine containing unexposed film is inserted in the camera.

Then the cover 2 is closed, causing unlocking of the push button starting and stopping mechanism, it being noted that the brake lever 111 is already in released position. Consequently, the camera is in condition for normal operation controlled by the push button starting and stopping mechanism. At the initiation of the run of the camera mechanism, the depression 117 passes out of registry with the disk engaging portion of the brake lever 111, immediately after which the brake lever is released from the latch lever 147 and is maintained in release position by the disk 116 until the end of the predetermined run of the camera mechanism when the disk engaging portion of the brake lever engages in the depression 117 to stop the camera mechanism at the end of such run.

Figure 12:
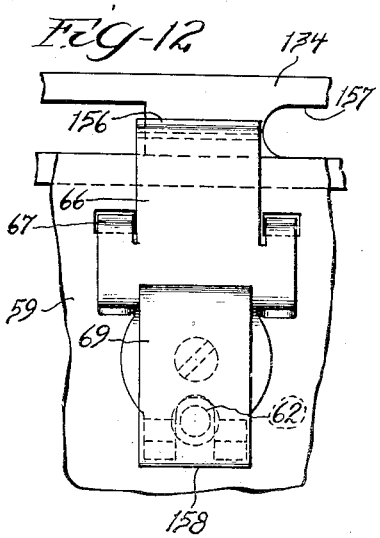
Figure 12 is a partial interior view.

The aforementioned lever 66 is controlled by the plate 134 by means of the upper end of the lever being bent, as designated at 156, see Figures 11 and 12, to engage against a face of the plate 134 when the plate is in its forward position to permit the spring 69 to operate the stud 62 and its clutch member 63 into position to engage the clutch slot 65 of the forward film roll spindle 39. When the plate 134 is in its rear position the portion 156 of the lever 66 engages in a slot 157 in the plate under the influence of the free end of the spring 69 engaging the plate 59, as designated at 158, to retract the stud 62 and its clutch member 63 out of clutch engaged position, the end 156 camming over the edge of the slot 157 in the movement of the plate 134.

Thus, the stud 62, and its clutch member 63 are retracted from clutch engaged position when the plate 134 is in its rear position or when the cover 2 is open. Consequently the forward clutch member 63 does not interfere with interchange of magazines, this clutch member being moved automatically into clutch engaged position with forward movement of the plate 134 effected by closing the cover 2.

Pivotally mounted on the plate 134 adjacent its rear end is a lever 159 which is yieldably urged, by a spring 161 on the plate, downwardly against a ratchet bar 162 provided with ratchet teeth 163 engaging downwardly upon the rear or film feed pinion 58, for intermittently rotating the same with reciprocation of the ratchet bar. See Figure 13. The bar 162 is slidable forwardly and rearwardly to rotate this pinion, the rear end of the bar engaging in a forwardly and rearwardly extending slot in the plate 59, as designated at 164.

The rear end of the lever 159 is provided with a forwardly facing abutment 165 adapted to engage a rearwardly facing abutment 166 on the ratchet bar 162 for moving the ratchet bar forwardly to rotate the rear pinion 58 with forward movement of the plate 134 from its rearward position and consequently with closing movement of the cover 2. An extrusion 167 on the ratchet bar 74 engages the front end of the ratchet bar 162 to move the same rearwardly with rearward movement of the ratchet bar 74, the ratchet bar normally remaining in its rear position.

A stud 168 on the rear end of the lever 159 engages in a cam slot 169 in the frame plate 59 to raise the rear end of the lever 159 out of abutting relation with the ratchet bar 162 when the plate 134 is at the forward end of its movement to permit rearward movement of the ratchet bar 162, the lever 159 establishing abutting relation with this ratchet when the plate 134 is moved to its rearward position.

Thus the rear or feed film roll is given an initial feeding movement independently of the camera mechanism to effect slack in the film for the initial intermittent feed thereof, this initial feeding movement being effected automatically with the closing of the cover 2.

The cover 2 is provided internally with yieldable latch members 171 at the top and bottom wall portions thereof, see Figure 2, and these engage cooperating latch formations 172 at the free ends of transverse portions 173 of a forwardly and rearwardly movable plate 174 arranged between the outer frame plate 5 and the adjacent wall of the camera casing. See Figure 7. A spring 175 yieldably urges the plate 174 into its forward position, in which position the latch members 172 are engaged with the latch members 171 to lock the cover in closed position.

The forward end of the plate 174 projects transversely and is provided with a forwardly projecting push stud 176 which projects through an aperture in the front wall member 4 of the camera casing for manual manipulation to operate the plate rearwardly for unlocking the cover 2 to open the same.

The transversely projecting forward end of the plate 174 is provided with a rearwardly projecting portion 177 which lies in front of a cooperating portion 178 on the front end of the brake lever 111 when the brake lever is in release position to prevent opening of the camera, see Figure 17, thus preventing the camera from being opened until the brake lever is in stopping position as shown in Figure 18. Accordingly the camera cannot be opened until the predetermined run of the camera has taken place.

While I have described and shown the preferred embodiment of my invention I do not wish to be limited to the precise details of construction as changes may readily be made without departing from the spirit of my invention, but having thus described my invention, I claim as new and desire to secure by Letters Patent the following:

1. In a motion picture film magazine the combination of a magazine of flat form for containing sensitized film and comprising two members provided with engaged edge flanges one of said casing members having an exposure opening in the flange thereof, a film guide member within the casing and arranged in underlying relation with said opening and light trapping the same from the interior of the casing and forming with the portion of said flange adjacent said opening a film guide through which the film passes from and to the enclosure of the casing, spring means carried by the last mentioned casing member and interlocked with said guide member to position the same and yieldably urging the same against the flange of this casing member, and a second spring means carried by the other casing member and yieldably urged against the edge of a film in said guide.

2. In a motion picture camera the combination with a camera device and a magazine for containing sensitized film adapted to be interchangeably mounted on the camera device and having its front wall portion curved and provided with a correspondingly curved intermittent film feed exposure guide, of an intermittent film feed shuttle pivoted on the camera device to one side of said magazine and having a portion projecting transversely in front of the magazine for engagement with a film in said guide, an exposure shutter pivoted on the camera device at said side of said magazine and having a shutter portion projecting transversely in front of the magazine, and means on said camera device at said side of the magazine for oscillating said shuttle and shutter in timed relation.

3. In a motion picture camera the combination with a camera device and a magazine for containing sensitized film adapted to be interchangeably mounted on the camera device and having its front wall portion curved and provided with a correspondingly curved intermittent film feed exposure guide, of an intermittent film feed shuttle pivoted on the camera device to one side of said magazine and having a portion projecting transversely in front of the magazine for engagement with a film in said guide, an exposure shutter pivoted on the camera device at said side of said magazine and having a shutter portion projecting transversely in front of the magazine, a second exposure shutter on said transverse portion of said shuttle, and means on said camera device for oscillating said first mentioned shutter and said shuttle in timed relation whereby said shutters cooperate to effect a light cut off and cut on in the same direction.

4. In a motion picture camera the combination with a camera device and a magazine for containing sensitized film adapted to be interchangeably mounted on the camera device and having its front wall portion curved and provided with a correspondingly curved intermittent film feed exposure guide, of an intermittent film feed shuttle pivoted on the camera device to one side of said magazine substantially on the axis of said curved wall portion and having a portion projecting transversely in front of the magazine for engagement with a film in said guide, an exposure shutter pivoted on said camera device at said side of said magazine and substantially coaxial with said shuttle and having a shutter portion projecting transversely in front of the magazine, a second exposure shutter on said transverse portion of said shuttle, a revoluble cam on said camera device at said side of said magazine on an axis parallel to that of said shuttle, and two devices engaging said cam at spaced points to effect movement of said first mentioned shutter and said shuttle in timed relation and adapted to effect movement of said shutters together in continuing light interrupting relation with the feed movement of said shuttle and in separate successive relation in the other direction for effecting a light cut off and cut on in the same direction.

5. In a motion picture machine the combination with a revoluble cam, of a pivoted intermittent film feed shuttle, a light shutter pivoted coaxially with said shuttle, an engagement between said cam and the intermediate portion of said shuttle for oscillating the shuttle, an intermediately pivoted lever, a second engagement spaced from said first mentioned engagement between said cam and one end of said lever for oscillating said lever, and an operative connection between the other end of said lever and said shutter for oscillating the same.

6. In a motion picture machine the combination of a revoluble ratchet toothed film roll drive element, a reciprocating ratchet member engaging said drive element for driving the same, a second ratchet member mounted on said first mentioned ratchet member for reciprocation therewith and engaging said drive element to cooperate therewith to drive said drive element at a fast rate, and automatic means for intermittently rendering said second ratchet member inoperative to effect a substantially uniform rate of feed movement of the film at the roll.

7. In a motion picture machine the combination of means for driving a film roll, additional means cooperating with said first mentioned means to drive said film roll at a faster rate and adapted to be rendered inoperative, and cam means operating in timed relation with said driving means for intermittently rendering said additional driving means inoperative to effect a substantially uniform rate of feed movement of the film at the roll.

8. In a motion picture machine the combination of two reciprocable ratchet members cooperating for driving a film roll at a fast rate, a revoluble member for reciprocating said ratchet members, and a cam member operating in timed relation with said revoluble member for intermittently rendering one of said ratchet members inoperative to effect a substantially uniform rate of feed movement of the film at the roll.

9. In a motion picture machine the combination of two ratchet members cooperating for driving a film roll at a fast rate, a revoluble cam member for reciprocating said ratchet members, a second revoluble cam member for intermittently rendering one of said ratchet members inoperative in a progressively varying manner, and a ratchet drive connection for driving said second cam member in timed relation with said first mentioned cam member.

10. In a motion picture machine the combination with two revoluble ratchet toothed film roll drive elements, of a reciprocating ratchet member engaging said drive elements to drive the same, additional reciprocating ratchet means engaging said drive elements and cooperating with said ratchet member to drive said drive elements at a fast rate, and automatic means intermittently rendering said additional ratchet means inoperative independently with reference to said drive elements and in opposite progressively varying manners to effect a substantially uniform and equal rate of feed movement of the film at said drive elements.

11. In a motion picture machine the combination with two revoluble ratchet toothed film roll drive elements arranged in spaced parallelism, of a reciprocable ratchet member extending therebetween and engaging said drive elements to drive the same, two additional ratchet members pivotally mounted for independent movement on said first mentioned ratchet member and engaging respective of said drive elements and cooperating with said first mentioned ratchet member to drive said drive elements at a fast rate, a revoluble cam member for reciprocating said ratchet members, a second revoluble cam member provided with two cam formations for intermittently rendering said additional ratchet members inoperative independently with reference to said drive elements and in opposite progressively varying manners, a ratchet wheel fixed with said second cam member, and a third reciprocable ratchet member operatively connected with said first mentioned cam member and engaging said ratchet wheel to rotate said second cam member.

12. In a motion picture machine the combination of means operated by the mechanism of the machine for driving a film roll, additional means operated by the mechanism of the machine and cooperating with said first mentioned means to drive said film roll at a faster rate and adapted to be rendered inoperative, means operated in timed relation with the mechanism of the machine and intermittently rendering said additional means inoperative in a predetermined progressively varying manner to effect a substantially uniform rate of feed movement of the film at the roll, and means for automatically stopping operation of the machine at the end of a cycle of said third mentioned means.

13. In a motion picture machine the combination of two ratchet devices operated by the mechanism of the machine and cooperating to drive a film roll at a fast rate, one of said devices being adapted to be rendered inoperative, a single revolution element operated in timed relation with the mechanism of the machine, a cam on said single revolution element for intermittently rendering said last mentioned ratchet device inoperative in a predetermined progressively varying manner to effect a substantially uniform rate of feed movement of the film at the roll, means for stopping the mechanism of the machine and normally inoperative, and means on said single revolution element for effecting stoppage of said mechanism at the end of each revolution thereof.

14. In a motion picture camera adapted to have a film magazine containing sensitized film interchangeably mounted thereon the combination of means operated by the camera mechanism and detachably connected with feed and rewind film rolls in the magazine and adapted for driving the same at independently variable rates, means operating in timed relation with the camera mechanism and controlling said driving means to effect a substantially uniform and equal rate of feed movement of the film at said rolls and adapted to operate continuously through successive cycles with continued operation of the camera mechanism, each cycle corresponding with the run of a predetermined length of film, and means for automatically stopping operation of the camera mechanism at the end of each cycle of said controlling means.

15. In a motion picture camera adapted to have a film magazine containing sensitized film interchangeably mounted thereon the combination of means operated by the camera mechanism and detachably connected with feed and rewind film rolls in the magazine and adapted for driving the same at independently variable rates, a revoluble element driven with the camera mechanism to make one revolution to the run of a predetermined length of film, two cams on said single revolution element for controlling said driving means to drive said film rolls at opposite progressively varying rates to effect a substantially uniform and equal rate of feed movement of the film at said rolls, means for stopping operation of the camera mechanism and normally inoperative, means on said single revolution element whereby said stopping means stops the camera mechanism at the end of each revolution of said single revolution element, and a film footage indicating member fast with said single revolution element.

16. In a motion picture camera adapted to have a film magazine containing sensitized film interchangeably mounted thereon the combination of means operated by the camera mechanism and detachably connected with feed and rewind film rolls in the magazine for driving the same at independently varying rates comprising means for driving said film rolls and additional means for driving the same and cooperating with said first mentioned means to drive said film rolls at a fast rate and adapted to be rendered independently inoperative with reference to said film rolls, a revoluble element, ratchet means driving said revoluble element in timed relation with the camera mechanism, two cams fast on said revoluble element for intermittently rendering said additional means inoperative independently with reference to said film rolls to effect a substantially uniform and equal rate of feed movement of the film at said rolls, means for stopping operation of the camera mechanism and spring pressed into stopping position, and an element fast on said revoluble element and normally positioning said stopping means out of stopping position and provided with a formation permitting movement of said stopping means into stopping position.

17. In a motion picture machine the combination of means for driving feed and rewind film rolls at independently varying rates, automatic means controlling said driving means to effect a substantially uniform and equal rate of feed movement of the film at said rolls, and means for giving the feed film roll an initial winding movement independently of said driving means.

18. In a motion picture camera the combination with a camera device including a casing provided with an opening through which a magazine containing sensitized film may be interchangeably mounted therein and a cover closing said opening, of means operated by the camera mechanism and detachably connected with feed and rewind film rolls in the magazine for driving the same and means operated with closing movement of said cover for giving the feed film roll an initial winding movement.

19. In a motion picture machine the combination with means for stopping operation of the mechanism of the machine and yieldably urged into operative position, means operated with the mechanism of the machine and normally maintaining said stopping means inoperative and adapted to render the same operative at the end of a run of the mechanism of the machine, manually operated means for rendering said stopping means inoperative to effect further run of the mechanism, means automatically operative to retain said stopping means in inoperative position and means operated with the mechanism of the machine for rendering said automatically operative means inoperative with operation of the mechanism of the machine to a point where said second mentioned means retains said stopping means in inoperative position.

20. In a motion picture camera the combination with a camera device including a casing provided with an opening and a cover closing said opening, of means for stopping operation of the mechanism of the camera, means operated with the mechanism of the camera and normally maintaining said stopping means inoperative and adapted to render the same operative at the end of a run of the mechanism of the camera, and means under the control of opening movement of said cover for rendering said stopping means inoperative to effect a further run of the camera mechanism.

21. In a motion picture camera the combination with a camera device including a casing provided with an opening and a cover closing said opening, of means for stopping operation of the mechanism of the camera, means operated with the mechanism of the camera and normally maintaining said stopping means inoperative and adapted to render the same operative at the end of a predetermined run of the camera mechanism, means operated by movement of said cover for rendering said stopping mechanism inoperative, means for automatically locking said stopping means in inoperative position, and means operated with the camera mechanism for rendering said locking means inoperative with operation of the mechanism of the camera to a point where said second mentioned means maintains said stopping means in inoperative position.

22. In a motion picture camera the combination with a camera device including a casing provided with an opening and a cover closing said opening, of means for stopping operation of the camera mechanism, means operated with the camera mechanism and normally maintaining said stopping means inoperative and adapted to render the same operative at the end of a predetermined run of the camera mechanism, manually controlled latch means for locking the cover in closed position, means preventing operation of said manually controlled means to unlock said cover while said stopping means is in inoperative position, means operated by movement of said cover for rendering said stopping means inoperative, means for automatically locking said stopping means in inoperative position, and means operated with the camera mechanism for rendering said locking means inoperative with operation of the camera mechanism to a point where said second mentioned means maintains said stopping means in inoperative position.

23. In a spring driven motion picture camera the combination with manually controlled means for starting and stopping operation of the camera mechanism, of additional means for stopping operation of the camera mechanism, means operated with the camera mechanism and normally maintaining said additional stopping means inoperative and adapted to render the same operative at the end of a predetermined run of the camera mechanism, means normally inoperative and adapted to be actuated to simultaneously render said starting and stopping means inoperative to start and said additional stopping means inoperative, and means whereby said additional stopping means is maintained in inoperative position, upon movement of said fourth mentioned means to inoperative position, until said third mentioned means is operated to a point where it maintains the same in inoperative position.

24. In a spring driven motion picture camera the combination with a camera device including a casing provided with an opening and a cover closing said opening, of manually controlled means for starting and stopping operation of the camera mechanism, additional means for stopping operation of the camera mechanism, means operated with the camera mechanism and normally maintaining said additional stopping means inoperative and adapted to render the same operative at the end of a predetermined run of the camera mechanism, manually controlled latch means for locking the cover in closed position, means preventing operation of said latch means to unlock said cover while said additional stopping means is in inoperative position, means operated by movement of said cover for rendering said starting and stopping means inoperative to start and for rendering said additional stopping means inoperative, means for automatically locking said additional stopping means in inoperative position, and means operated with the camera mechanism for rendering said locking means inoperative with operation of the camera mechanism to a point where said third mentioned means maintains said additional stopping means in inoperative position.

25. In a motion picture machine the combination with a revoluble disk element provided with a slot therethrough extending inwardly from the periphery thereof substantially on a chord of said disk element and terminating at its inner end within said periphery to form a stop formation, of a cooperating stop element yieldably urged in the direction to engage said disk element and said stop formation, manually operated means for operating said stop element in the direction away from said disk element, a second disk element fixed for rotation with said first mentioned disk element and having a diameter less than that of the same and provided with a peripheral depression, and a formation peripherally engaging said second disk element to maintain said stop element out of engagement with said first mentioned disk element and engageable in said depression to permit engagement of said stop element with said stop formation.

ALBERT S. HOWELL.